Jan. 9, 1968   E. Y. MELLANDER   3,362,094
APPARATUS FOR EXAMINING X-RAY FILMS
Filed Nov. 9, 1964   2 Sheets-Sheet 1

INVENTOR
EINAR YNGVE MELLANDER

ATTORNEYS

Jan. 9, 1968  E. Y. MELLANDER  3,362,094
APPARATUS FOR EXAMINING X-RAY FILMS
Filed Nov. 9, 1964  2 Sheets-Sheet 2

INVENTOR.
EINAR YNGVE MELLANDER

BY *Young & Thompson*

ATTORNEYS

United States Patent Office 3,362,094
Patented Jan. 9, 1968

3,362,094
APPARATUS FOR EXAMINING X-RAY FILMS
Einar Yngve Mellander, Goteborg, Sweden, assignor to Järnhs Elektriska Aktiebolag, Solna, Sweden, a joint-stock company of Sweden
Filed Nov. 9, 1964, Ser. No. 409,782
Claims priority, application Sweden, Nov. 12, 1963, 12,447/63
2 Claims. (Cl. 40—31)

ABSTRACT OF THE DISCLOSURE

Apparatus for examining X-ray films comprises a cabinet having a lighted window and upper and lower rollers for the film. The lower roller is carriage-mounted to slide into the cabinet. A flexible transparent plastic band is trained about the rollers and has transparent pockets to hold the films, the pockets being formed by resilient strips on one side of the plastic band. Plastic strips secured to the rear of the band serve as reinforcements opposite the resilient strips on the front of the band.

---

This invention relates to an apparatus for examining a large number of X-ray films at one and the same time. Different kinds of apparatus for this purpose are known, the X-ray films generally being suspended in glass frames which can be taken from storage magazines arranged at the side of the viewing apparatus or above or below a lighted window in the same.

The most commonly used X-ray films vary in size from 13 x 18 cm. to 36 x 43 cm. and, as each examination generally involves a large number of exposures, a considerable volume of magazine space will obviously be required.

This invention relates to a viewing apparatus in which the amount of storage space required has been reduced to a minimum, a further feature being that a set of X-ray films arranged in a certain sequence can conveniently be transported from a place for primary examination to another place for final examination. As a result of the use of developing machines for X-ray films, which is becoming increasingly common, the primary examination can be made with dry film, the entire picture material being available at one and the same time.

The viewing apparatus according to this invention comprises a cabinet having a lighted window or other lighted surface on the front, a first roller rotatably mounted above said lighted window, a second roller rotatably mounted below said lighted window, and a flexible light-permeable plastic band provided with pockets or fastening devices for the X-ray films, said band being adapted to be wound on and off the two rollers, thus leading the films past the lighted window.

According to the invention, the picture material can thus be stored and transported wound up on rollers which can easily and conveniently be inserted in and taken out of the viewing apparatus.

Figure 1:
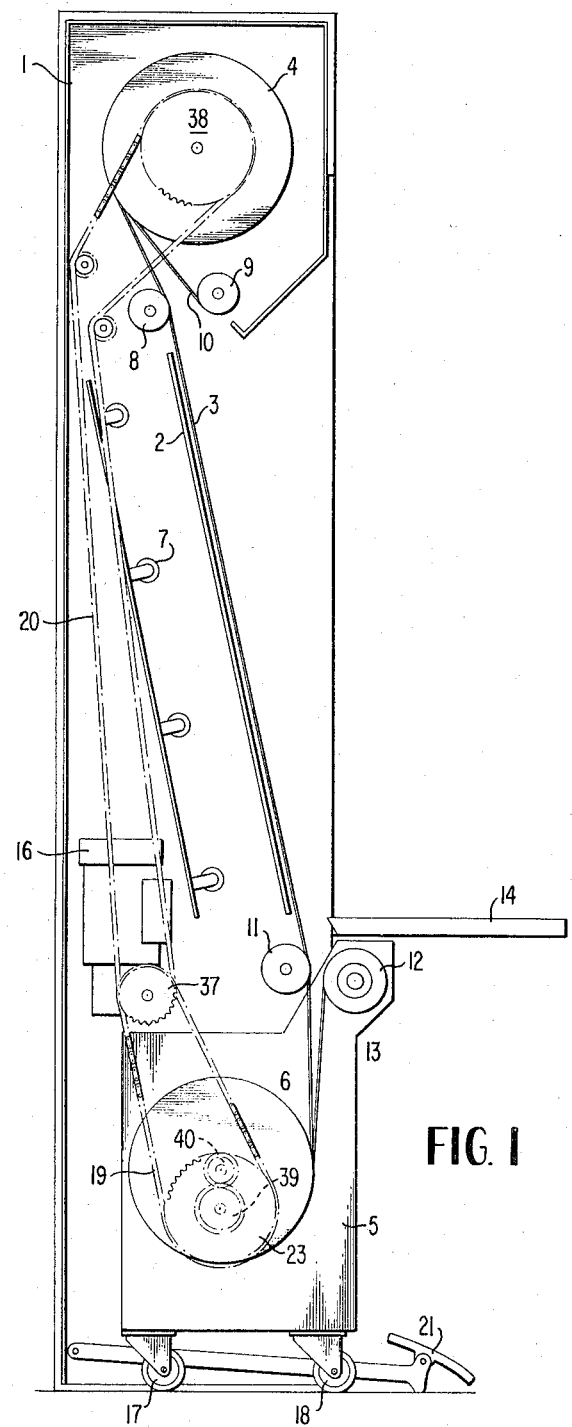
Figure 5:
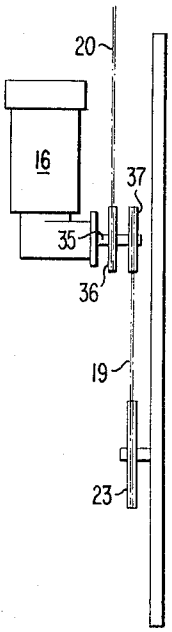
Figure 2:
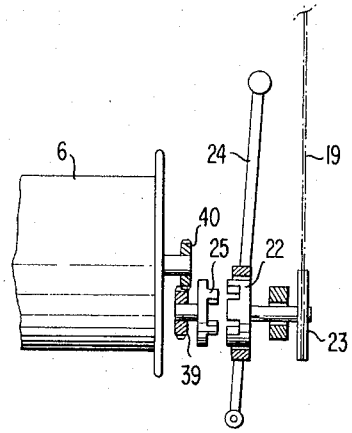
Figure 3:
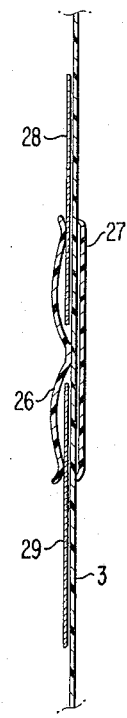
Figure 4:
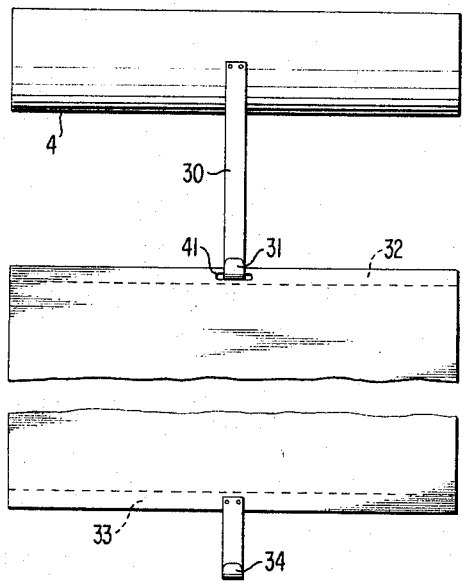

To clarify the invention reference is had to the appended drawing illustrating a preferred embodiment of the viewing apparatus. FIG. 1 is a schematic side view of the apparatus. FIG. 2 shows a toothed clutch forming part of the apparatus. FIG. 3 is a side view of a translucent flexible plastic band used in the apparatus and shows the pockets provided thereon for the X-ray films. FIG. 4 is a front view of the upper roller or drum in the apparatus and of the flexible plastic band and is intended to illustrate both how the plastic band is connected to the rollers and how several such bands may be connected together. FIG. 5 shows a detail of the roller-drive mechanism.

In FIG. 1 reference numeral 1 designates a cabinet, which is provided with a lighted window at the front and in which a panel 2 of a suitable translucent material such as opal glass or opalizing Plexiglas is arranged. As shown in the figure, this panel is preferably inclined slightly upwards and rearwards. Behind the same there is a light source, for instance in the form of a number of fluorescent tubes or light bulbs 7.

Fitted in the upper part of the cabinet 1, above the lighted window 2, is an easily removable upper roller 4, and under the said lighted window there is a carriage 5, preferably on wheels, which can be slid into the cabinet and which carries an easily insertable and removable roller 6.

According to the invention, the X-ray films 28 and 29 (FIG. 3) are inserted in pockets on a flexible and light-permeable plastic band 3 which from the lower roller 6, inserted in the cabinet and carrying said band and films in the form of a reel, can be moved over the upper roller 4, the plastic band with the films thereby passing over the light-permeable panel 2, where the films can be examined against the lighted background. Arranged immediately above and immediately below the panel 2 are guide rollers 8 and 11 for the plastic band 3.

Numeral 16 designates a reversible motor arranged in the cabinet 1 to drive the rollers 4 and 6. The drive can be arranged with any suitable transmission device, e.g., chains and sprockets. According to FIG. 5, two sprockets 36 and 37 are mounted on the motor shaft 35. A chain 20 runs from sprocket 36 to a sprocket 38 on the shaft of the upper roller 4 and a chain 19 runs from sprocket 37 to a sprocket 23 in the lower part of the cabinet 1 in the vicinity of the shaft of the roller 6.

Numerals 22 and 25 designate a lever-operated toothed clutch between the shaft of the lower sprocket 23 and a gear train 39, 40 arranged on the carriage 5 and driving the lower roller 6.

The motor 16 is controlled by means of a suitable operating means, such as a pivoted pedal 21, which when actuated in one direction or the other via suitable switches and contactors starts the motor 16 for rotation in one direction or the other, suitable freewheel arrangements in the transmissions of rollers 4 and 6 allowing the motor to be in driving connection with only one roller at a time.

The pedal 21 is conveniently reachable by the viewer of the film, who sits in front of the lighted window 2 and has at his disposal a table leaf 14 projecting from the cabinet. The pockets for the X-ray films can naturally be formed in many different ways. In FIG. 3, the plastic band 3 is shown fitted with glued-on transverse strips 26, made of transparent plastic material and arranged to press resiliently against the plastic band so that the X-ray films inserted in the pockets thus formed are securely retained. A plastic strip 27 attached to the rear of the plastic band serves as a reinforcement or abutment under the resilient strips 26 affixed to the front. As illustrated, the strips 26 may suitably be attached to the plastic band 3 in such a manner that each strip forms both an upper and a lower pocket, so that X-ray films 28, 29 can be inserted from both above and below.

It may be advantageous, especially in connection with the lower roller 6 but possibly also on the upper roller 4, to arrange protective cloths 10 and 13 which are wound on and off separate rollers 9 and 12 driven either by means of a spring motor or from the motor 16, the said protective cloths extending over the X-ray films when the plastic band holding the films is wound up on rollers 4 and 6, respectively, thus ensuring that the X-ray films will not be folded or damaged while being wound onto a roller.

The plastic band 3, which may be of considerable length, e.g., several tens of yards, is preferably reinforced or braced at the ends by means of bars 32 and 33 (FIG. 4) of a relatively rigid material. To connect the plastic band with the rollers, a narrow strip 30 may be attached to, for instance, the upper roller 4, in between its ends, the said strip having at its free end a hook 31 which is hooked into a slot 41 in the bar 32. At the lower end of the plastic band 3, to the center of the bar 33, a similar strip 30 may be attached, the said strip being provided at its free end with a hook 34, which can be hooked into a clasp on the lower roller 6 or into the slot 41 in a second plastic band with which the first band is to be lengthened. The provision of the centrally positioned strips 30 prevents the plastic band from being slanted when wound onto the rollers. The connection arrangements described above are naturally to be regarded only as examples and can be varied in numerous ways. The important thing is that they are simple and convenient to handle.

The operation of the viewing apparatus should be evident from the above without further explanation. A roller 6 with a wound-on plastic band 3 is inserted in the carriage 5 which is slid into the cabinet. The band is then wound successively up onto the upper roller 4 and the X-ray films are suitably placed in the pockets to undergo primary examination. The plastic band is then wound back to the lower roller 6 which, when the carriage 5 has been withdrawn, can be taken out and conveyed to another, similar viewing apparatus for final examination of the films.

What I claim is:

1. An apparatus for examining X-ray films, which comprises a cabinet having a lighted window, a first roller mounted for rotation above the lighted window, a second roller mounted for rotation below the lighted window, said second roller being carried in a carriage which slides into the cabinet, a flexible light-permeable plastic band, fastening devices for X-ray films on said band, said fastening devices comprising pockets on the flexible plastic band which are formed by transverse strips attached to the band, said strips being transparent and adapted to press the X-ray films resiliently against the plastic band, each said strip being attached to the plastic band in a manner to form both an upper and a lower pocket, reinforcement strips attached to the rear side of the plastic band opposite said pocket-forming strips, and means for winding said band on and off the said rollers thereby to lead the films past said lighted window.

2. An apparatus as claimed in claim 1, wherein the plastic band runs at a slant upwards and backwards from the lower roller to the upper roller so that the X-ray films inserted in the fastening devices tend to rest against the said plastic band.

References Cited

UNITED STATES PATENTS

| | | | |
|---|---|---|---|
| 2,328,055 | 8/1943 | Clough | 242—67.4 X |
| 2,497,445 | 2/1950 | Gaul | 250—67 X |
| 2,766,538 | 10/1956 | Iorio | 40—31 |
| 2,800,733 | 7/1957 | Chevillon | 40—31 |

EUGENE R. CAPOZIO, *Primary Examiner.*

W. H. GRIEB, *Examiner.*